(12) United States Patent
Gregoire

(10) Patent No.: US 6,547,214 B2
(45) Date of Patent: Apr. 15, 2003

(54) SERPENTINE ACTUATOR DISK

(76) Inventor: Roger J. Gregoire, 460 Elm Valley Dr., Bulverde, TX (US) 78163

( * ) Notice: Subject to any disclaimer, the term of this patent is extended or adjusted under 35 U.S.C. 154(b) by 74 days.

(21) Appl. No.: 09/681,615

(22) Filed: May 8, 2001

(65) Prior Publication Data

US 2002/0166984 A1 Nov. 14, 2002

(51) Int. Cl.$^7$ .............................................. F16K 31/12
(52) U.S. Cl. ...................................................... 251/58
(58) Field of Search ..................... 251/58, 221; 74/110

(56) References Cited

U.S. PATENT DOCUMENTS 4,955,582 A * 9/1990 Baumann ..................... 251/58
6,059,259 A * 5/2000 Gregoire et al. ............. 251/58

* cited by examiner

Primary Examiner—Gene Mancene
Assistant Examiner—Melvin A. Cartagena
(74) Attorney, Agent, or Firm—Howrey Simon Arnold & White LLP

(57) ABSTRACT

A serpentine disk lever that can be utilized for surround-type levering in a pneumatically controlled valve actuator for high pressure applications. The design of the serpentine disk lever allows it to have the flexibility required for surround-type levering, whereby the disk lever may transition from a flat to a frusto-conical shape, and the strength necessary for high pressure levering applications. High flexibility results from the disk lever's serpentine pattern, which is created by cutting alternating internal and external slits into the disk from the internal and external edges, respectively. High Strength is created by use of a hard material and by limiting stress concentration by use of a generally symmetric disk shape as well as rounded edges within the internal and external slits of the serpentine pattern.

12 Claims, 5 Drawing Sheets

SERPENTINE ACTUATOR DISK

BACKGROUND OF INVENTION

Field of the Invention

The present invention relates generally to pneumatic valve actuators and, more particularly, to pneumatic valve actuators utilizing methods and devices for force multiplication in the actuation process.

Pneumatically actuated valves are commonly used to control the flow of fluids where remote operation is desired. Examples include utilization in automated processes and hazardous locations. Pressurized air supplying systems for pneumatic controls are typically limited to a maximum pressure of 80–100 psig. Because of this low pneumatic control pressure, pneumatic valve actuators, and especially those that control high pressure fluids through an associated valve, are typically very large in physical size. The large size is necessary to provide a sufficiently large surface area upon which the pneumatic pressure works to generate the force required to control the flow of fluid through the associated valve. At higher fluid pressures, a proportionally higher force is needed to maintain control.

Typical pneumatic valve actuators consist of single and multiple piston designs. Pneumatic pressure acting on the exposed surface area of the piston(s) determines actuator force. Pneumatic valve actuators, and particularly the larger size actuators, pose problems for system designers of fluid distribution systems. Due to exhaust requirements, space constraints, and other relevant factors, it is greatly desirable to minimize the physical size of these pneumatic valve actuators without reducing their ability to generate actuation force or sacrifice valve performance.

Known actuators are disclosed in U.S. Pat. Nos. 4,684,103; 4,875,404; and 5,253,671 wherein attempts have been made to reduce the actuator's size by utilizing a force multiplication mechanism to enable the generation of high forces relative to actuator size. Although the size of these actuators is somewhat reduced, the reductions in size come with inherent disadvantages. The force multiplying mechanism in each of these actuators consumes a substantially large portion of the actuator size and resultantly limits the overall size reduction permitted of the actuator. Also, the force multiplying mechanism in each of these actuators requires an increase in the number of moving parts within the actuator. These additional moving parts increase actuator complexity and decrease its overall reliability.

U.S. Pat. No. 6,059,259 successfully addresses the above described deficiencies, but is more complex than the present invention which has purposely been developed as a simplified solution to the need for size reduction.

Surround-type lever applications, such as a conical-type lever, have proved helpful, but overall unsuccessful because of strength and flexibility inadequacies. A traditional surround-type disk lever is used by applying an actuating force to one side of the disk proximate an interior or exterior edge to pivot the opposite edge about a fulcrum that is located along the opposite surface of the disk. Such a lever has an actuating benefit of allowing application of the actuating force over a large area. A levering benefit, generic to all lever applications, is accomplished via creation of an output levering force that is a multiple larger than the actuating force. Such efforts have proved unsuccessful for high-pressure, small space, applications because arrangements with sufficient flexibility for surround-type levering do not have the strength or rigidity required to actuate the applicable higher pressure valves. Conversely, levers with sufficient strength and rigidity often do not have the flexibility required to accommodate the configuration changes necessary for surround-type levering.

The arrangement of the present invention has been developed in response to these drawbacks which have been appreciated in the art, and as well to provide further benefits to the user. These enhancements and benefits are described in greater detail herein below with respect to several alternative embodiments of the present invention.

SUMMARY OF INVENTION

The present invention alleviates the drawbacks described above with respect to known pneumatic force multiplication actuator devices by employing a serpentine disk lever that has the strength and flexibility required for high pressure applications. The present invention is disclosed in several embodiments and incorporates beneficial features in addition to those just stated as will be described herein below.

Generally, the present invention provides a disk that is flexible enough to be used as a surround-type lever while also being strong enough to accommodate high force transmission requirements, such as those present in high pressure valve systems. The high strength of the disk is accomplished through using a hard material and a specified shape. An example of an applicable hard material of construction is hardened steel. A preferred shape of the disk is circular, whereby the stresses experienced in the disk during use are endeavored to be evenly distributed throughout the disk. The flexibility requirement of levering with a disk, or surround-type levering, is accomplished by the particular cutting of the disk, which will be described in detail.

Benefits of this disk lever configuration, in addition to substantial strength and flexibility increases, permits a smaller and lighter disk arrangement, conservation of construction material, and increased durability. A smaller sized lever is now possible because of the ability to utilize a much stronger material. A weaker material would necessitate use of a disk of significantly greater dimensions to accommodate equal force requirements. A lighter weight disk is possible in the present invention because of the extraction of material to form the mentioned cuts, or slits. Similar benefits may also be provided, if during original formation of the disk, voids are provided where the cuts and slits have been prescribed. A lighter disk lowers the burden on disk production, disk transportation, and on the incorporating system of the disk. Conservation of material is possible by way of recycling the excess material created during the slit cutting process. In this way, the same amount of disk levers can be created from a lower amount of material. The durability, or robustness of the disk is increased by way of the material used, the disk shape, and the type and configuration of the cuts made in the disk. Each of these aspects contribute to minimizing stress concentrations, as well as withstanding those stresses that are induced during operation.

A particularly preferred utilization of the serpentine disk is as a lever in a valve actuator assembly. The purpose of a valve actuator is to open or close an associated valve. This opening and closing of the valve is typically accomplished by the action of a valve stem. While a spring in the actuator continuously works to force the valve stem toward the fully closed position, the disk lever, when actuated, works against this spring to force the valve stem toward the fully open position.

In one embodiment, the serpentine disk lever of the present invention is manufactured to have an outer, or external, and an inner, or internal, edge. Regarding one exemplary embodiment, when the actuator is in the closed position, the lever takes the form of a traditional disk having a planar, flat shape. The disk is located in the valve actuator housing so that it contacts a piston near its external edge. The location of this contact can be called the actuating location. The disk also contacts the valve stem near its internal edge. The location of this contact can be called the lifting location. Finally, to create a levering system, the disk rests on a fulcrum. The location of the contact between the disk and fulcrum lies somewhere between the actuating and the lifting locations just mentioned. The fulcrum location is preferably located closer to the lifting location and the precise force multiplicating effect of the lever is affected by the exact location of the fulcrum. In operation, after the piston applies a downward force on the external edge of the disk, the disk pivots about the fulcrum to push the valve stem toward a fully open position or configuration. This action transforms the serpentine disk from a flat configuration to a frusto-conical configuration when considering a round serpentine disk.

As mentioned, a circular and hard disk with cuts made into it is a preferred embodiment for providing the strong and flexible disk needed in compact, high pressure, and surround-type lever applications. The disk is cut, by laser for example, to have a serpentine portion. A serpentine shape is created by making alternating cuts, or slits, into the disk from the interior and external edges. In this way, each internal cut, except for those that are at the end of a serpentine pattern, is disposed between a pair of external cuts, and visa versa. Such alternating cutting forms a general zigzag pattern, which as the name serpentine intimates, resembles a snake that has its body going back and forth on the ground. Therefore, if a person was to follow or trace the continuous material that forms the serpentine pattern with their eye or finger, they would have to travel back and forth through the windings that are formed. Such a winding trace would be required because there is no connection between the legs of the serpentine pattern besides those proximate the internal and external extremities of the disk. In the flat-disk configuration, the extremes, where the legs of the windings are connected, are alternatively located near the internal and external edges of the disk. This and other aspects of the invention will become more apparent upon review of the entire disclosure, and especially when the figures are considered.

A properly created serpentine pattern will allow for the flexibility required for the disk to transition from its flat, planar shape, to its conical shape, while not compromising the strength required for high pressure levering applications. The flexibility is created because the several legs of the serpentine pattern will be able to move with respect to each other. This relative movement will occur as the legs are allowed to flex at the mentioned connection points located at the internal and external edges of the disk. Disk flexing is possible because of the absence of material, or spaces between the legs. Specifically, when a flat round disk is flexed into a frusto-conical shape, the material at the internal edge of the disk will have a tendency toward spreading out as the aperture created by the inner hole becomes larger because of the cone shape being formed. At the same time, the material around the external edge will have a tendency to move closer together as the external edge becomes smaller as the cone shape is being formed. As will be described in further detail, it is the slits, and the specific shape and orientation of these slits, that allows for the disk to flex as required while not compromising levering capability.

As mentioned before, a more flexible material can be used instead of the hard material with serpentine cuts prescribed by the present invention. Unfortunately though, a material flexible enough to allow levering from a flat shape to a cone shape without the relief aspects of the described cuts or voids cannot also be strong enough to impose a very great lifting force at the lifting edge. Instead of lifting, for example, the softer disk will likely and undesirably bend about the fulcrum point when levering is attempted. Conversely, the overall strength or radial rigidity of a disk with the prescribed serpentine design is maintainable based on the shape of the cuts, or slits. In effect, each of the radial legs formed between the radial cuts in the disk will work as an individual lever. In this way, twenty legs effectively work like twenty separate levers.

In one embodiment, the disk lever of the present invention has more than one portion with a serpentine configuration. A benefit of having multiple serpentine shaped portions in a disk is a corresponding increase in flexibility. For locating the serpentine portions, a user may depend on variables such as the location of the actuating force being applied to the disk lever, the location of the lifting force resulting from levering, and the shape of the disk being used.

In a particularly preferred embodiment, a serpentine pattern according to the present invention is cut into the entirety, or almost the entirety of the disk lever. In this embodiment, external slits are cut inwardly into the disk from the entirety of the outside perimeter or external edge and internal slits are cut outwardly into the disk about the entirety of the inside perimeter or internal edge. Given that each internal slit is disposed between adjacent external slits in this configuration, a pattern is established around the disk that alternates between internal and external slits. Flexibility is high in this embodiment because the disk is capable of adjusting the configuration of its inner edge (getting a bit larger) and its outer edge (getting a bit smaller) as the disk transitions about the fulcrum from a flat shape to a frusto-conical shape.

In the illustrated embodiment, the internal slits of the serpentine disk are disposed intermediate, or midway between, adjacent external slits. This characteristic can be utilized when the entire disk is serpentine, when many portions of the disk are serpentine, or even when only one portion of the disk is serpentine. As a compliment, each external slit is disposed intermediate adjacent internal slits. In this configuration, each external slit is disposed intermediate adjacent internal slits, and visa versa, so that the serpentine pattern formed about the disk is uniform. For embodiments in which the entire disk is serpentine, the pattern extends around the entirety of the disk.

As will be appreciated by those familiar with the art, disk strength is compromised when stress is allowed to be focused in certain parts of the disk because of the increased likelihood that a fracture or failure will occur at that location. The symmetry that results from the uniform cutting of a circular disk is important to strength maintenance because of the lower tendency for stress concentration.

In yet another embodiment or variation, the internal and external slits are cut in specified ways that further maximize flexibility and limit stress concentrations. As an example, the external slits may be formed to be twice as wide as the internal slits, and each type of slit designed to terminate in a round-shaped closed end. The internal and/or external slits may be further enhanced by adding a bulbous aperture at the terminal end of the slits. Although specific examples of slit cutting are given, such as laser cutting, it will be appreciated by those skilled in the art that other ways of shaping the disk will be obvious to implement.

Having the external slits twice as wide as the internal slits promotes strength and flexibility. Although a disk that is transitioned from a flat shape to a frusto-conical shape experiences noticeable flex at both its external and internal edges, much greater flex is necessary at the external edge. Wider slits at the external edge help to accommodate this greater flex. Additionally, although the disk can have wider internal slits than those shown, smaller slits are sufficient for the lower flexibility needed at the internal edge. Furthermore, having the internal slits thinner promotes greater strength by allowing for more disk material to be present.

Having rounds or bulbous apertures at the extreme, or distal, internal or terminating ends of some, or all of the internal and external slits promotes operational strength and rigidity. The ability for stress to concentrate is lowered by having significant, continuous, or bulbously defined slit terminations.

Regarding the bulbous apertures that may be formed in the distal ends of the slits, the radius of the bulb-portion can be advantageously a multiple greater than one and one-half of the width of appended slit. The bulbous apertures distribute stress over a larger surface; that is, the edge of the bulb, than would be otherwise possible when only a radius equal to half the width of the corresponding slit is used. Further advantages of having a bulb portion are that less material is utilized in the disks' production and lighter disks thereby result.

The beneficial effects described above apply generally to the pneumatic actuator of the present invention and its several possible embodiments. An exemplary structure through which these benefits may be delivered is described in detail herein below.

BRIEF DESCRIPTION OF DRAWINGS

Although the scope of the present invention is much broader than any particular embodiment shown or described herein, a detailed description of preferred and exemplary embodiments follows, together with illustrative figures in which like reference numerals refer to like components, and wherein.

DETAILED DESCRIPTION

Figure 1:
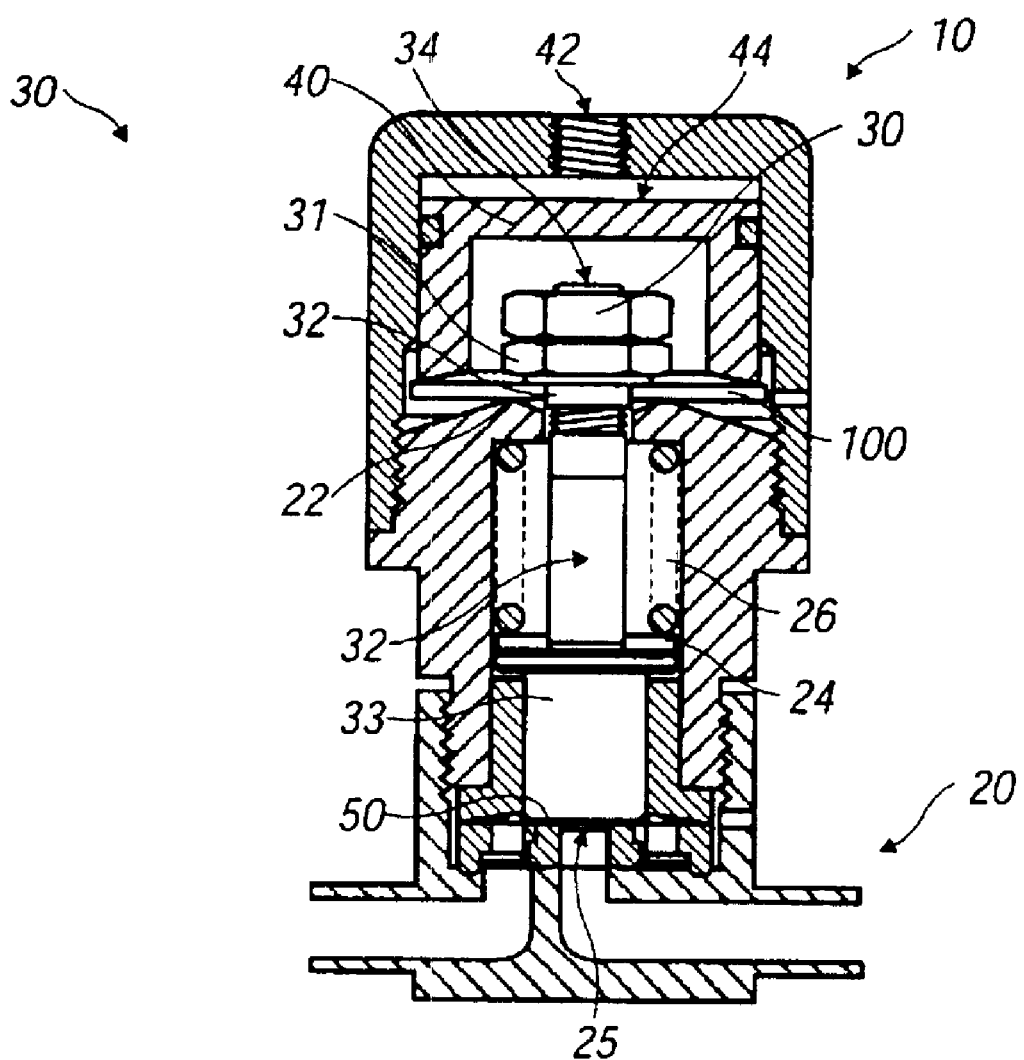
FIG. 1 is a side elevation cross-sectional view of an actuator in an associated diaphragm valve assembly shown in an unactuated, normally closed position with a serpentine-styled lever disk shown in a flat, planar configuration.
Figure 2:
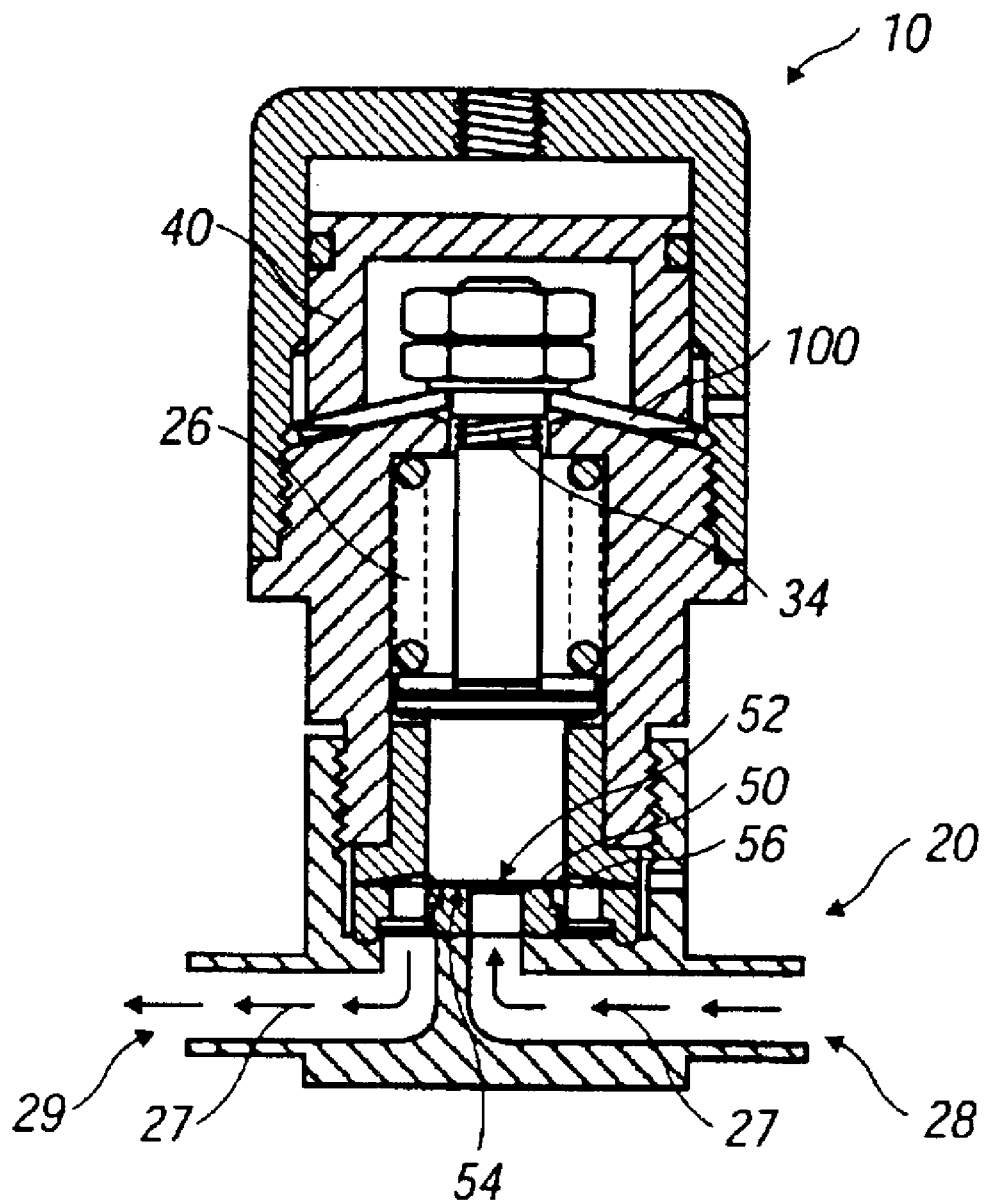
FIG. 2 is a side elevation cross-sectional view of the actuator of FIG. 1 showing the diaphragm valve assembly in an actuated and open position with the serpentine-styled lever disk transitioned to a frusto-conical configuration.

Although those of ordinary skill in the art will recognize many alternative embodiments, especially in light of the illustrations provided herewith, this detailed description is exemplary of one embodiment of the present invention that incorporates a disk lever 100 with at least one serpentine portion for use in a pneumatic valve actuator 10, the scope of which is limited only by the claims appended hereto. Referring to the figures, FIG. 1 shows a valve actuator 10, including a round-shaped serpentine disk lever 100 in a flat or planar, non-actuated configuration. The function of the valve actuator is to open and close an associated valve 20. The valve 20 is often used to control high pressure air supplies utilized in many manufacturing and process settings. The opening and closing of the valve 20 is accomplished by action of a valve stem 32. A spring 26 is provided in the actuator that continuously works to force the valve stem 32 toward a fully closed position as shown in FIG. 1. The serpentine disk lever 100, when actuated by a piston 40, works against the spring 26 to force the valve stem 32 toward the fully open position as illustrated in FIG. 2.

Specifically, closing of the valve 20 is accomplished as the valve stem 32 is forced down by the spring 26. The spring 26 pushes down on an upper side 24 of a base 33 of the valve stem 32. Under the downward biasing action of the spring 26, the valve stem 32 in turn presses down on an upper surface 52 of a diaphragm 50 at a valve stem base lower surface 25. Under this action, the diaphragm 50 closes off the flow 27 to be controlled through the valve 20 that is entering through the flow inlet 28 and exiting out the flow outlet 29 of the valve 20. As may be appreciated from FIG. 1, the flow 27 is fully cut off when the lower surface 54 of the diaphragm 50 is forced into complete engagement with a valve seat 56 which is located at the passage way between the valve flow inlet 28 and the valve flow outlet 29.

Conversely, when the valve stem 32 is forced upward against the force of the spring 26 by the serpentine disk lever 100, the diaphragm 50 is lifted off of the valve seat 56. In this way, the flowing fluid, gas or liquid, is again able to flow through the valve 20, as indicated by the reference numeral 27. Also, along with the extreme valve positions of fully open and fully closed, the valve 20 may be continuously and variably configured between these extremes. Discrete positions between these extremes may be maintained by proper manipulation of actuator 10, at the user's discretion.

Although a preferred embodiment employs a single compression spring 26 to create the closing force, one of ordinary skill in the art will appreciate that varying numbers and types of springs may be used. For example, a larger and stronger spring may be desired for higher pressures. Such a spring may require larger housing requirements, as well as a larger actuating, or original, force for actuation. To accommodate the larger actuating and levering force requirements, a slightly larger piston and a slightly larger disk lever 100 may be needed.

In operation, a pneumatic input force, such as air pressure, is supplied to the valve actuator 10 via a pneumatic pressure inlet 42. Pressure built within the actuator exerts or causes a downward force against the upper surface 44 of the piston 40. In turn, the piston 40 applies an actuating force upon the disk lever 100 proximate its external edge 120, thereby causing the external edge 120 of the disk lever 100 to be pressed downward. Due to this lowering of the external edge 120, from a radial perspective, the disk lever 100 rotates about the fulcrum 22, thereby causing an internal edge 110 of the disk 100 to responsively move upward. When the internal edge 110 of the disk 100 is transitioned upwardly, this edge 110 applies a similarly upward force to the stem 32. In a preferred embodiment, a shoulder nut 31 and a lock nut 30 are secured to the upper portion 34 of the valve stem 32.

In this embodiment, the internal edge 110 of the disk lever 100 pushes up on the valve stem 32 via this shoulder nut/lock nut combination 31/30.

Because of the disk's 100 round shape, the pressing down of the disk's external edge 120 and the lifting of the disk's 100 internal edge 110 transitions the disk 100 from a flat and planar configuration to frusto-conical configuration or shape. FIG. 1 shows the flat configuration of the serpentine disk lever 100 in side-view, without cross-hatching to distinguish the lever 100 from the surrounding components of the valve actuator 10. FIG. 2 shows the transitioned-to frusto-conical configuration of the serpentine disk lever 100 in similar detail. For clarity, a frusto-conical shape is considered herein as being a conical shape that is truncated at its apex. Flexibility in the disk lever 100 is required to accommodate this shape-transition of the disk 100.

Figure 3:
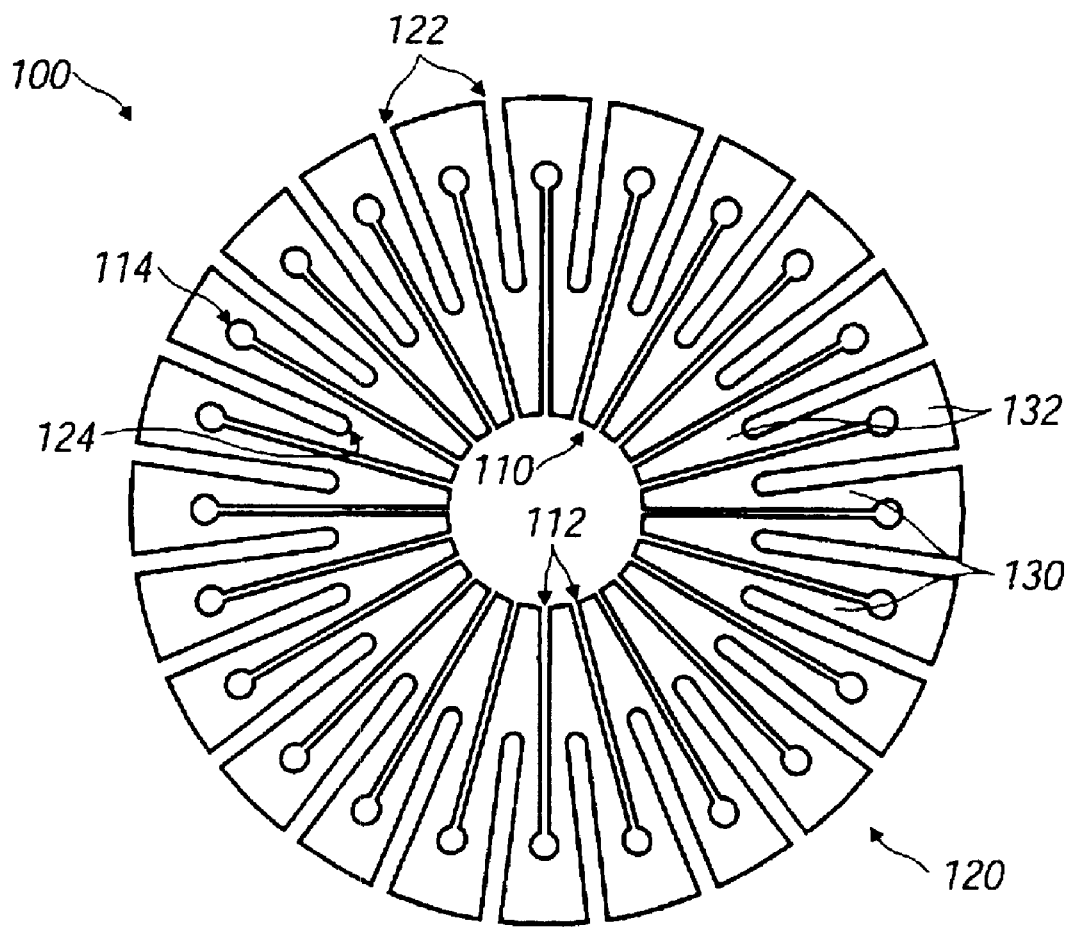
FIG. 3 is a top view of the serpentine disk lever illustrating parallel-walled external slits.

FIG. 3 shows a particularly preferred embodiment of the serpentine disk 100. The serpentine disk 100 is flexible enough to be used in surround-type levering while also being strong enough to accommodate high magnitude forces applied thereto. Such high force transmission requirements are often required in high pressure valve systems. The high strength of the disk can be accomplished through using hard construction material(s) and a specified shape. An example of an applicable hard construction material is hardened steel. A preferred shape of the serpentine disk 100 is circular, as shown in FIG. 3, whereby the stresses experienced in the serpentine disk lever 100 during use are endeavored to be evenly distributed across the body of the disk lever 100. The flexibility requirement of surround-type levering using a disk is accomplished by the particular cutting of the disk 100, described in greater detail herein below.

Benefits of this disk lever 100 configuration, in additional to substantial strength and flexibility, include allowing for a smaller and lighter disk, conservation of material, and increased durability. A smaller sized serpentine disk lever 100 is now possible because of the ability to utilize a much stronger construction material. A weaker material would necessitate use of a disk 100 of significantly greater dimensions to accommodate high force requirements. A lighter weight disk 100 is possible in the present invention because of the extraction of material to form the mentioned cuts, or slits 112 and 122. A lighter disk 100 lowers the burden on disk production, disk transport, and on the system into which the disk is incorporated. Conservation of material is possible by way of recycling the waste material created during the slit forming process. In this way, a set number of disks 100 can be manufactured from less material when recycling of the waste is considered. The durability, or robustness, of the disk 100 is increased by way of the material used, the disk shape, and the type of cuts made in the disk, all of which cooperate to keep stress from concentrating in a particular location.

A circular disk 100 with cuts 112, 122 made therein is a preferred embodiment for providing a sufficiently strong and flexible disk 100 as that needed in compact, high pressure, and surround-type lever applications. The disk 100 is cut, by laser for example, to have a serpentine portion. A serpentine shape is created by making alternating cuts, or slits, into the disk from the interior and external edges, as may be appreciated from FIG. 3. In this way, each internal slit 112, besides any cut that falls at the end of the serpentine pattern, will be disposed between external cuts 122, and visa versa. Such alternating cutting forms a general zigzag pattern, like a snake that has its body going back and forth, its entire body being on the ground. Therefore, if a person was to follow or trace the material in the serpentine pattern with their eye or finger, they would have to travel back and forth through the windings formed by the legs 130 being connected at connection points 132. Such a winding trace would be required because there is no connection between the legs 130 of the serpentine pattern besides those at the extremities or connection points 132 of the serpentine disk lever 100. In the disk form, these extremities 132, where the legs of the windings are connected, are alternatively located near the internal 110 and external 120 edges of the disk as shown in FIG. 3.

A properly created serpentine pattern will allow for the flexibility required for the serpentine disk lever 100 to transition from its flat, planar shape shown in FIG. 1, to its frusto-conical shape shown in FIG. 2, while not compromising the strength required for high pressure levering applications. The flexibility is created because the several legs 130 of the serpentine pattern will be able to move with respect to each other. This relative movement will occur as these legs 130 are allowed to flex at the mentioned connection points 132 located at the internal 110 and external edges 120 of the disk lever 100. Disk flexing is possible because of the absence of material between the legs 130.

Specifically, when a flat disk 100 is transitioned into a conical shape, the material at internal edge 110 of the disk 100 will have a tendency to spread out as the aperture created by the inner hole becomes larger as the conical shape is being formed. At the same time, the material around the external edge 120 will tend to move closer together as the external edge 120 become smaller because of the cone shape being formed. As will be described in further detail, it is the presence and specific shape and orientation of these slits 112 & 122, that allows for the disk 110 to flex as required while not compromising levering strength. It is this same shape and orientation that allows for the disk 100 to maintain its strength. In effect, each of the legs 130 formed by the cuts 112/122 will work as its own separate lever. In this way, for example, the forty-eight legs 130 shown in FIG. 3 effectively work like forty-eight separate mini-levers during operation of this embodiment.

In a particularly preferred embodiment, the disk lever 100 of the present invention has more than one portion with a serpentine shape. The benefit of having an increase of serpentine shape portions in a disk 100 is a corresponding increase in flexibility. A user may desire to locate serpentine portions depending on variables such as the location of the actuating force being applied to the lever 100, the location of the lifting force resulting from levering, and the shape of the disk 100 being used.

In another particularly preferred embodiment, a serpentine pattern is cut into the entire, or almost the entire disk lever 100, as shown in FIG. 3. In this embodiment, there will be external slits 122 cut into the serpentine disk lever 100 from and around the substantial entirety of the external edge 120 around that entire external edge 120. Likewise, internal cuts 112 will be cut into the serpentine disk lever 100 from and around the substantial entirety of the internal edge 110. Recall that each internal slit 112 is preferably disposed between adjacent external slits 122. In this way the slits form a pattern around the serpentine disk lever 100 that alternates between internal 112 and external 122 slits. Flexibility is high in this embodiment because the disk 100 is highly capable of adjusting its inner edge 110(getting a bit larger) and its outer edge 120(getting a bit smaller) as it transitions about the fulcrum 22 from its flat to its frusto-conical shape.

In a further particular embodiment, the internal slits 112 are disposed intermediate, or midway between, adjacent external slits 122. This characteristic can be used when substantially the entire disk 100 is serpentine, as shown in FIG. 3, when many portions of the disk lever 100 is serpentine, or even when only one portion of the disk lever 100 is serpentine. In still a further embodiment, each external slit 122 is disposed intermediate adjacent internal slits 112. In the event that each external slit 122 is disposed intermediate adjacent internal slits 112, and visa versa, the serpentine pattern formed will be uniform. For the particular embodiment where the entire disk 100 is serpentine, the pattern will thereby be uniform around the entire disk 100. Disk strength is lowered when stress tends to focus in certain locations because of the increased likelihood that fracture or failure will occur at that location. The symmetry that results from uniform cutting of a circular disk 100 is important to strength maintenance because of the lower tendency for stress concentration.

In one embodiments, the internal 112 and external slits 122 can be cut in a variety of ways to maximize flexibility and limit stress concentration. These ways include having the external slits 122 to be twice as wide as the internal slits 112, and each having radii 114, 124 cut into the end of the internal and/or the external slits, and having a bulb shaped aperture 124 at the end of the internal 112 and/or external slits 122. Although specific examples of slit cutting is given, it will be appreciate by one of ordinary in the art that other manners of shaping will be obvious to implement.

Having the external slits 122 twice as wide as the internal slits 112 promotes strength and flexibility. Although a serpentine disk lever 100 that is transitioned from a flat shape to a frusto-conical shape experiences noticeable flex at both its external 120 and internal 110 edges, much greater flex, via more change in shape, is necessary at the external edge 120. Wider slits at the external edge 120 help to accommodate this greater flex that the disk 100 experiences in that region. Also, although the serpentine disk lever 100 can have wider internal slits 112 than those particularly embodied, smaller slits are sufficient for the lower flexibility needed at the internal edge. Further, having the internal slits 112 thinner promotes strength by allowing for more disk material to be present.

Having radii at the extreme, or distal ends of some of, or all of the internal and external slits further promotes strength. Stress tends to concentrate at areas where there is a rapid change of direction, such as at a corner. The ability for stress to concentrate is lowered by utilizing these radii because of the presence of a significant, continuous, or defined radius alleviates the ability of stress to concentrate on rapid changes of direction, such as at a corner, that may be formed by the cut.

Having a bulb aperture 124 at the distal end of external 122 or internal 112 slits, whereby the radius at that distal end is be a multiple greater than half the width of that slit 112/122. Such an aperture 124 is a further manner to limit the concentration of stress at these serpentine disk levers 100. A bulb 124 distributes stress over a larger surface (i.e. the edge of the bulb) than is possible with a radius that is equal to half the width of the relative slit 112/122. Further advantages of having a bulb 124 are that less construction material is utilized in serpentine disk lever 100 production the ability to use less material and that a lighter serpentine disk lever 100 results.

A preferred construction material for the serpentine disk lever 100 is a steel of the tempered spring type (such as type 1095) and which is blue tempered, polished, and heat treated (such as to Rockwell C48–51). It is novel to be able to use such a hard material for such an application requiring such flexibility. Of course, it will be obvious to one of ordinary skill in the art to use various materials.

Materials and exact embodiments shown are provided only for exemplary purposes and to aid the reader in understanding the invention. Therefore, as in all aspects of the implementation of the present invention, a user may use his or her design skill to optimize and personalize the various characteristics while still remaining within the scope and purpose of the invention. While the foregoing specification describes exemplary embodiments of the present invention, those of ordinary skill in the art will recognize that many variations, alterations, modifications, substitutions and the like which may be made thereto. This is especially true in light of the description contained herein, together with the accompanying drawings.

Figure 4:
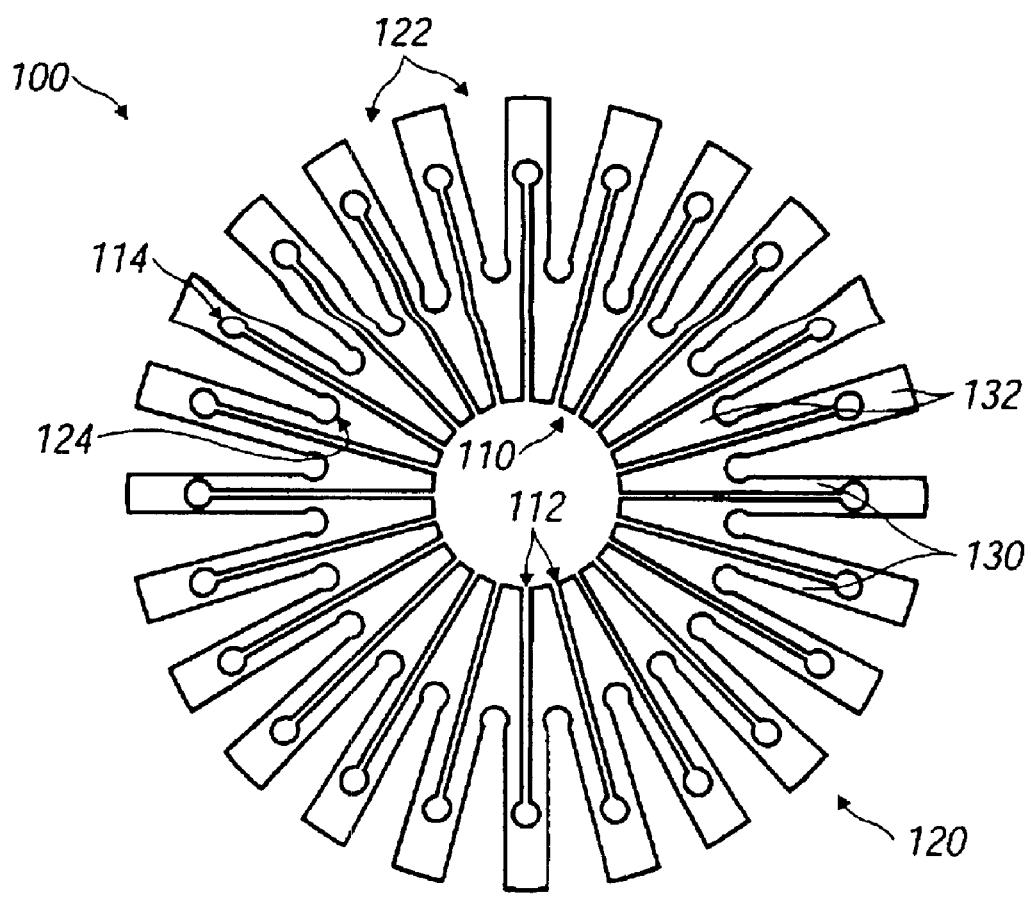
FIG. 4 is a top view of the serpentine disk lever illustrating triangularly oriented external slit walls and bulbous terminations for both internal and external slits.

As an example, the serpentine disk lever 100 may be square, rectangular, or oval in shape, instead of the circular shape disclosed herein. Similarly, various number, shape and distribution of internal 112 and external slits 122 are possible. As an example, the slits 112 and/or 122 may be triangularly shaped, as opposed to having substantially parallel sides; these comparable features being illustrated in FIGS. 3 and 4, respectively. This configuration, when strategically utilized, can permit greater deformation or degrees of transformation of the lever 100 without interference occurring between adjacent legs 130. Utilization of such a triangular configuration may be best appreciated when considering the external cuts 122 and assuming that the disk 100 has been transformed to an extreme conical shape. By providing essentially pie-shaped cutouts 122, the disk 100 can be transitioned to a greater conical extent; that is, with the external edge 120 being turned up to a greater degree without adjacent legs 130 interfering with one another at the exterior periphery.

Figure 5A:
FIG. 5A is a side perspective elevational view of the serpentine disk lever in an up-turned configuration.
Figure 5B:
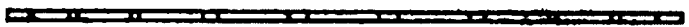
FIG. 5B is a side perspective elevational view of the serpentine disk lever in a substantially flat and planar configuration.
Figure 5C:
FIG. 5C is a side perspective elevational view of the serpentine disk lever in a down-turned configuration.

It should also be appreciated that the disk 100 may have an initial configuration that is conical or turned-up when relaxed such as under the conditions earlier described with respect to FIG. 1, but illustrated in the schematic of FIG. 5A. Upon full actuation, this up-turned configuration may invert so that a down-turned configuration is assumed as shown in FIG. 5C. On its way from the up-turned configuration to the down-turned configuration, the lever disk 100 transitions through the flat, planar configuration that is depicted in FIG. 5B. In order that the disk 100 be sufficiently rigid and suitably strong for intended applications, such an originally conical shape may be formed in steel and then heat-treated to enhance these desirable characteristics.

As before, any transitional configuration between the extreme inverted configurations of a conical disk 100 may be attained and held. For instance, full actuation may cause an originally cone-shaped disk 100 to transition only to a flat disk orientation. It should be appreciated that such a transitional cone shape; that is, one that inverts, will provide twice the stroke of one that only transitions between a flat configuration and a conical orientation. This can be highly desirable if the article to be moved or actuated by the disk requires a relatively high degree of travel to transition from one to another configuration, such as from closed to open as in the case for the valve 20 that is used illustratively hereinabove.

Also, spring 26 could be combined or replaced with the same type or a different type of spring. In any case, because the scope of the present invention is much broader than any particular embodiment, the foregoing detailed description should not be construed as a limitation of the scope of the present invention, which is limited only by the claims appended hereto.

What is claimed is:

1. A valve actuating system comprising:

at least one spring biased to apply a spring force to a stem in a first direction; and a disk lever having an interior edge and an exterior edge, said lever positioned to abut an actuator at a levering location of said lever, said levering location being proximate said external edge of said lever, said lever positioned to interact with said stem at a lifting location of said lever, said lifting location being proximate said internal edge of said lever, said lever contacting a fulcrum at a location that is between said levering and lifting locations, and said lever having a portion that is serpentine.

2. The valve actuating system as recited in claim 1, wherein said lever has a plurality of portions that are serpentine.

3. The valve actuating system as recited in claim 1, wherein a substantial entirety of said lever is serpentine.

4. The valve actuating system as recited in claim 1, wherein said lever is substantially circular.

5. The valve actuating system as recited in claim 1, wherein said lever is disposed so that when said actuator applies an original force to said lever in said first direction, said lever flexibly rotates about said fulcrum and thereby applies a relieving force greater than said original force to said stem in a direction opposite said first direction.

6. The valve actuating system as recited in claim 5, wherein said lever has a plurality of external slits having respective widths and being cut inward from said exterior edge.

7. The valve actuating system as recited in claim 6, wherein said lever has a plurality of internal slits that are cut outward from said interior edge and disposed between adjacent external slits.

8. The valve actuating system as recited in claim 7, wherein said internal slits are disposed intermediate adjacent external slits.

9. The valve actuating system as recited in claim 8, wherein the width of each external slit is at least twice the width of each internal slit.

10. The valve actuating system as recited in claim 9, wherein said external and internal slits terminate in proximate ends having defined radii for limiting stress concentration.

11. The valve actuating system as recited in claim 10, wherein each of said internal slits terminates in a proximate end having a defined radius with a radial measurement of at least 3 times the width of each of said internal slits.

12. The valve actuating system as recited in claim 11, wherein there is at least 24 external slits.

* * * * *